United States Patent Office 3,646,090
Patented Feb. 29, 1972

3,646,090
PROCESS FOR PREPARING LINEAR CHLORINE TERMINATED SILOXANE COMPOUNDS
Everett W. Bennett, Katonah, N.Y., assignor to Union Carbide Corporation, New York, N.Y.
No Drawing. Filed May 29, 1969, Ser. No. 829,105
Int. Cl. C07f 7/08; C08f 11/04
U.S. Cl. 260—448.2 E          10 Claims

ABSTRACT OF THE DISCLOSURE

A process for preparing low molecular weight linear chlorine terminated siloxane polymers by reacting a cyclotri-, cyclotetra- or cyclopentasiloxane with thionyl chloride in the presence of a catalyst such as phosphine compound, a phosphine oxide or an amine N-oxide. The said siloxane polymers find utility as cross-linking agents for room temperature vulcanizable resins and rubber systems.

BACKGROUND OF THE INVENTION

This invention relates to a process for producing linear chlorosiloxane polymers. More particularly this invention relates to a process for preparing linear chlorine terminated siloxanes by opening a cyclosiloxane ring compound with thionyl chloride in the presence of a catalyst.

Heretofore, chlorine terminated siloxane polymers have generally been prepared by only two basic syntheses: (1) limited water hydrolysis of chlorosilanes as seen by U.S. Pat. 2,381,366 and (2) acid catalyzed equilibration of siloxanes with chlorosilanes, as seen by U.S. Pat. 2,421,653. However both routes suffer from a general inability to afford high yields of a given specie, especially the low molecular weight homologues of chlorine terminated siloxanes.

SUMMARY OF THE INVENTION

It has now been discovered that the above disadvantages can be overcome and that linear chlorine terminated (endblocked) siloxane polymers can be obtained by opening a cyclosiloxane ring compound with thionyl chloride in the presence of a catalyst.

Therefore, it is an object of this invention to provide an efficient and economical process for preparing linear chlorine terminated siloxane polymers. It is also an object of this invention to provide a process for selectively preparing species of low molecular weight chlorine terminted siloxane polymers in high yields. Other objects and advantages of this invention will become readily apparent from the following description and appended claims.

More specipcally the instant invention can be described as a method for preparing low molecular weight chlorine terminated siloxane polymers which comprises reacting, in the presence of a catalytic amount of a catalyst selected from the group consisting of phosphine compounds, phosphine oxides, amine oxides or mixtures thereof, (A) an organocyclosiloxane having the formula

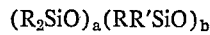

where $a$ is an integer of 1 to 2 inclusive; where $b$ is an integer of 1 to 4 inclusive; and where the sum of $(a+b)$ is 3 to 5 inclusive; wherein each R is individually a monovalent substituted or unsubstituted hydrocarbon radical; and wherein each R' is individually a monovalent substituted or unsubstituted nonaromatic hydrocarbon radical, with (B) thionyl chloride; whereby the cyclosiloxane forms a linear siloxane polymer having a chlorine atom attached to each of its terminal silicon atoms.

DESCRIPTION OF THE PREFERRED EMBODIMENTS

It should be uderstood that the above formula

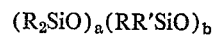

is used herein and in the claims to represent the cyclotrisiloxanes, cyclotetrasiloxanes and cyclopentasiloxanes which can be used in the process of this invention and no specific definition is intended nor should be interpreted from said formula as to how the individual siloxy units, $(R_2SiO)_a$ and $(RR'SiO)_b$ aline themselves in the cyclic structure, since said siloxy units can be in any random position or order in the cyclic ring of the cyclosiloxane compound employed.

Each R radical in the above cyclosiloxane formula individually represents a radical selected from the group consisting of a monovalent hydrocarbon radical having from 1 to 18 carbon atoms and a substituted monovalent hydrocarbon radical having from 1 to 18 carbon atoms, while each R' represents a monovalent nonaromatic hydrocarbon radical having from 1 to 18 carbon atoms and a substituted monovalent nonaromatic hydrocarbon radical having from 1 to 18 carbon atoms. Such cyclosiloxanes as well as methods for their preparation are well known in the art. Illustrative examples of such R radicals are alkyl radicals such as methyl, ethyl, propyl, isopropyl, butyl, isobutyl, tertiarybutyl, 2-ethylhexyl, decyl, dodecyl, hexadecyl, octadecyl and the like; alkenyl radicals such as vinyl, allyl, hexadienyl and the like; aryl radicals, such as phenyl, naphthyl and the like; alkaryl radicals such as methylphenyl, dimethylphenyl and the like; aralkyl radicals such as benzyl, phenylethyl and the like and cycloalkyl radicals such as cyclopentenyl, cyclohexenyl and the like. Illustrative examples of such R' radicals are alkyl radicals such as methyl, ethyl, propyl, isopropyl, butyl, isobutyl, tertiarybutyl, 2-ethylhexyl, decyl, dodecyl, hexadecyl, octadecyl, and the like; alkenyl radicals such as vinyl, allyl, hexadienyl and the like; and cycloalkyl radicals such as cyclopentenyl, cyclohexenyl and the like. The above R and R' hydrocarbon radicals can be substituted with any substituent which does not interfer with the instant process. Illustrative substituents that can be carrier by the above R and R' hydrocarbon radicals include halogen, i.e. chlorine, bromine, idoine and fluorine, cyano, nitro, acyloxy, alkoxy radicals and the like. Such types of substituted radicals that can be mentioned are 2,4,6-trichlorobenzyl, p-chlorophenyl, p-nitrophenyl, perchlorophenyl, p-iodiophenylethyl, p-fluorophenyl, 2-bromonaphthyl, α,α,α-trifluorotolyl, chloromethyl, gammachloropropyl, betacyanoethyl, betacyanopropyl, betacyanobutyl, gammacyanopropyl, gammacyanobutyl, deltacyanobutyl, omegacyanooctadecyl, gammamethacryloxypropyl, gammamethoxypropyl,3,3,3 - trifluoropropyl, 3,3,4,4,5,5,5 - heptafluoropentyl, 5,5,5-trifluoro-2-trifluoromethylamyl, and the like. Preferably each R is a monovalent radical containing from 1 to 8 carbon atoms selected from the group consisting of alkyl, substituted alkyl, vinyl, aryl and substituted aryl radicals, especially methyl, ethyl and phenyl radicals. Preferably each R' is a monovalent radical containing from 1 to 8 carbon atoms selected from the group consisting of alkyl, substituted alkyl, and vinyl radicals, especially methyl and ethyl radicals. Most preferably every R and R' represents a methyl radical. Illustrative cyclosiloxane compounds include for example:

$$[(CH_3)_2SiO]_3;\ [(CH_3)_2SiO]_4;\ [(CH_3)_2SiO]_5$$
$$[(C_2H_5)_2SiO]_3;\ [(C_2H_5)_2SiO]_4;\ [(C_2H_5)_2SiO]_5$$
$$[(CH_3)(C_2H_5)SiO]_3;\ [(CH_3)(C_2H_5)SiO]_4$$
$$[(CH_3)(C_2H_5)SiO]_5;\ [(CH_3)_2SiO]_2[(CH_2H_5)_2SiO]_2$$
$$[(CH_3)(CH_2{=}CH)SiO]_3$$
$$[(CH_3)_2SiO]_2[(CH_3)(SH_2{=}CH)SiO]$$
$$[(CF_3CH_2CH_2)(CH_3)SiO]_3$$
$$[(NCCH_2CH_2)(CH_3)SiO]_3$$
$$[(Cl_2C_6H_3)(CH_3)SiO]_3$$
$$[(CH_3)_2SiO]_3[(CH_3)(C_6H_5)SiO]$$
$$[(CH_3)_2SiO]_3[(C_6H_5)_2SiO]$$
$$[(CH_3)_2SiO]_4[(CH_3)(C_6H_5)SiO]$$
$$[(CH_3)_2SiO]_4[(C_6H_5)_2SiO];\ [(C_8H_{17})_2SiO]_3$$

and the like. The most preferred cyclics are the tetracyclic compounds, especially octamethylcyclotetrasiloxane.

As pointed out above the process of this invention must be carried out in the presence of a catalyst selected from the group consisting of a phosphine, a phosphine oxide, an amine oxide, or mixtures of said catalytic compounds, since it has been found that thionyl chloride per se does not operate to cleave the cyclosiloxane compounds.

Phosphine compounds as well as methods for their preparation are well known and exemplified in the prior art literature; as shown in "Organo-phosphorus Compounds" by Kosolapoff (1950) published by J. Wiley and Sons Inc., New York. Illustrative examples of such phosphine include $\phi_3P$, $(CH_3)_3P$, $(C_4H_9)_3P$, $\phi_2(C_4H_9)P$, $\phi(C_4H_9)_2P$, $(\phi CH_2)_3P$, $(C_2H_5)_3P$, $(CH_3)(C_2H_5)_2P$, $(C_8H_{17})_3P$, and the like wherein the symbol $\phi$ represents a phenyl ($C_6H_5{-}$) radical. The preferred phosphine catalysts have the formula $R_3P$ wherein each R individually represents a radical selected from the group consisting of phenyl and alkyl radicals having from 1 to 8 carbon atoms, especially $\phi_3P$, $(n-C_4H_9)_3P$, $\phi(C_2H_5)_2P$, and $\phi(n-C_4H_9)_2P$.

The expression phosphine oxide as used herein encompasses any compound containing an oxygen solely and directly attached to a phosphorus atom. Such phosphine oxides as well as methods for preparation are well known in the art, as shown in "Organo-phosphorus Compounds" by Kosolapoff (1950) published by J. Wiley and Sons Inc., New York. Illustrative examples of such phosphine oxides include $\phi_3PO$; $(CH_3)_3PO$; $(C_4H_9)_3PO$;

$$\phi_2(C_4H_9)PO$$

$\phi(C_4H_9)_2PO$; $(\phi CH_2)_3PO$; $(C_8H_{17})_3PO$; $(Me_2N)_3PO$;

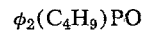
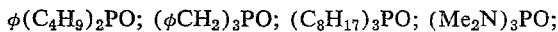

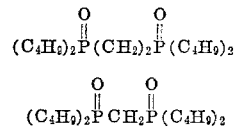

and the like. The symbol Me represents a methyl radical while the symbol $\phi$ is the same as defined above. The preferred phosphine oxide catalysts have the formula $R_3PO$ wherein each R individually represents a radical selected from the group consisting of alkyl having from 1 to 8 carbon atoms, phenyl and dimethylamino radicals, especially $\phi_3PO$; $\phi(n-C_4H_9)_2PO$; $(n-C_4H_9)_3PO$ and

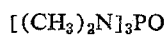

The expression amine oxide as used herein encompasses any compound containing an oxygen atom solely and directly attached to a nitrogen atom. Such amine oxides as well as methods for their preparation are well known in the art, as shown in "Advanced Organic Chemistry" by Fusion (1950) published by J. Wiley and Sons Inc., New York. The preferred amine oxide catalysts have the formula $R_3NO$ wherein each R individually represents a monovalent hydrocarbon radical having from 1 to 8 carbon atoms and selected from the group consisting of alkyl, aryl, alkaryl, aralkyl and cycloalkyl radicals, such as methyl, ethyl, propyl, isopropyl, butyl, tert-butyl, 2-ethylhexyl, octyl, phenyl, benzyl, toluene cyclohexyl and the like, or each R and N taken collectively can form a heterocyclic ring structure such as pyridine and the like.

Illustrative examples of some of more preferred amine oxides include, pyridine N-oxide; 2,6-dimethylpyridine N-oxide; 4-mehylpyridine N-oxide; 4-methylpyridine N-oxide; 2-methylpyridine N-oxide; 4-cyanopyridine N-oxide; triphenyl N-oxide and the trialkyl N-oxides having from 1 to 8 carbon atoms such as trimethyl N-oxide; triethyl N-oxide, tributyl N-oxide, trioctyl N-oxide, and the like. The most preferred amine oxide catalyst is pyridine N-oxide.

The amount of catalyst employed is not critical for it obviously need only be a catalytic amount. Generally amounts of catalysts ranging from about 0.1 to about 2 percent by weight based on the total weight of cyclosiloxane employed will be sufficient, although amounts higher than 2 percent by weight of catalyst can be employed if desired.

In the reaction of this invention the general feature is the cleavage of the cyclosiloxane chain so that it is converted to a linear siloxane polymer having attached to each of its terminal silicon atoms a chlorine atom from the thionyl chloride reactant. This general catalyzed reaction can be described by the following illustrative equation:

$$(R_2SiO)_n + SOCl_2 \rightarrow Cl(R_2SiO)_{n-1}SiR_2Cl + SO_2$$

wherein R is the same as defined above and n is 3, 4 or 5. Generally the conversion of the lower cyclosiloxanes is most conveniently carried out by holding a thionyl chloride solution of the cyclosiloxane in the presence of a catalytic amount of catalyst until the evolution of sulfur dioxide gas ceases. The excess thionyl chloride, if any, can then be stripped (distilled away) and the reaction solution separated from the catalyst by simple decantation prior to final distillation of the desired product. Of course, it should be understood that if desired one may employ a mixture of such cyclosiloxane reactants and/or a mixture of above catalysts in the same process. When mixtures of materials are employed the reaction solution can be decanted from the catalysts and the desired individual species of linear chlorine terminated siloxane polymers separated and recovered by fractional distillation.

The complex interplay of various parameters such as the compounds involved in the process, their individual reactivity, process conditions, amount of thionyl chloride, etc., all effect the extent and amount of the specific linear chlorine terminated siloxane desired. For example, the stoichiometry of the reaction calls for 1 mole of thionyl chloride for each mole of cyclosiloxane compound employed for a theoretical 100 percent yield. However, lower amounts of thionyl chloride below that of the above 1:1 mole ratio can be employed, the only significance being that the yield of linear chlorine terminated siloxane product is reduced proportionately as the amount of thionyl chloride is reduced below the above 1:1 mole ratio. Thus the amount of thionyl chloride employed is not critical and need only be sufficient to cleave the cyclosiloxane ring. Moreover, not all cyclosiloxanes have the same reactivity due to electrical and stearic factors and not all of the catalysts have the same potency and solubility. For instance, the insolubility of the catalysts in the cyclosiloxanes even at a 1:1 mole ratio of thionyl chloride to cyclosiloxane can preclude a homogeneous reaction which is generally desirable for maximum yield and efficiency. However, this can be compensated for and a greater yield in a shorter time of desired specific linear chlorine terminated siloxane polymer obtained by increasing the amount of thionyl chloride above that of the aforementioned 1:1 mole ratio to effect a homogeneous reaction by bringing the catalyst into solution. Accordingly the upper amount of thionyl chloride employed is also not critical. Generally, however only a slight excess of thionyl chloride above the 1:1 mole ratio, for example a 3:1 or 4:1 mole ratio, will be sufficient to insure a very high yield of desired product. While as mentioned above, the amount of thionyl chloride employed need only be sufficient to cleave the cyclosiloxane ring of the starting material, obviously the preferred amount will be that minimum amount which will furnish the most optimum results and yield desired by the operator.

The reaction teperature of this invention can range from about 20° C. to 80° C., however, temperatures ranging from about 50° C. to about 70° C. are preferred. The reaction time is merely governed by the end result desired and easily monitored by recording the amount of evolved sulfur dioxide gas.

The process of this invention can also be carried out in the presence of an inert organic solvent. While the use of a solvent is not necessary, such is often desirable, especially when difficultly soluble catalysts are employed, since a homogeneous reaction is more conducive to higher yields. Any inert organic solvent can be employed which will not adversely effect the basic desired reaction. Suitable compounds include such conventional solvents as aliphatic and aromatic hydrocarbons such as hexane, benzene, toluene, xylene and the like; halogenated liquid hydrocarbons, such as dichloromethane, iodomethane, dibromomethane, 1,1,1-trichloroethane, chlorobenzene and the like; acetonitrile, and the like. The preferred solvents are benzene, toluene, chlorobenzene, and 1,2-dimethoxyethane. The amount of solvent employed is not critical, the preferred amount naturally being that minimum amount necessary to furnish a homogeneous reaction system.

The instant invention provides a method for producing high yields of specific linear low molecular weight chlorine terminated siloxane polymers. The chlorine terminated polymer products have a wide range of utility well known in the organo-silicon art. For example, their use in the preparation of precise heat curable silicone resins and elastomers is well known. They can also be used as cross-linking agents for room temperature vulcanizable resins or rubber systems. In addition, they can be employed as intermediates for producing a multitude of different functional siloxane polymers of high molecular weight, for instance they can be converted to alkoxy, acyloxy or hydroxy containing siloxane polymers and they can also be used to produce amino endblocked siloxanes, as shown for example by Union Carbide's United States Patent No. 3,467,686.

The following examples are illustrative of the present invention and are not to be regarded as limitative. It is to be understood that all parts, percentages and proportions referred to herein and in the appended claims are by weight unless otherwise indicated. The symbols Me, Et, Bu, Vi and $\phi$ represent the methyl, ethyl, n-butyl, vinyl and phenyl radicals respectively.

EXAMPLE 1

A 500 ml. flask equipped with a reflux condenser was charged with 111.2 grams (0.5 mole) of hexamethylcyclotrisiloxane, 364 grams (3.06 moles) of thionyl chloride and 4.75 grams of triphenylphosphine catalyst. The reaction evolved sulfur dioxide gas at 25° C. and the weight loss of said gas was calculated as heat was applied to the reaction solution. In two hours the temperature was 51° C. and the weight loss of sulfur dioxide was 21.4 grams. After an additional 1.5 hours the heat was removed and the reaction solution allowed to sit for 20 hours until sulfur dioxide ceased to be evolved. The total weight loss of sulfur dioxide was found to be 31.9 grams (32 grams theoretical) and after decantation from the catalyst, fractional distillation afforded 110.4 grams (a 79 percent yield) of linear 1,5-dichlorohexamethyltrisiloxane having the structural formula $$Cl-(SiMe_2O)_2SiMe_2Cl$$

Said siloxane product had a boiling point of 83° to 85° C. at 20 mm. and a refractive index of $n_D^{25}=1.4032$, while its vapor phase chromatographic analysis time was identical with that of a known sample of the same siloxane.

EXAMPLE 2

As a comparative experiment, Example 1 was duplicated except that the reaction was carried out in the absence of a catalyst. No sulfur dioxide gas was found to evolve (except for thermal expansion of the head-space vapor) over 24 hours at 71° C. and the 2.2 gram resultant weight loss of sulfur dioxide (32 grams theoretical) verified that no reaction occurred.

EXAMPLE 3

A 500 ml. flask equipped with a reflux condenser was charged with 111.2 grams (0.5 mole) of hexamethylcyclotrisiloxane, 364 grams (3.06 moles) of thionyl chloride and 4.8 grams of triphenylphosphine oxide catalyst. Sulfur dioxide gas evolved rapidly on mixing the reactants at 25° C. and the resultant weight loss of sulfur dioxide was 31.0 grams (32 grams theoretical) over 2 and ¼ hours while heating to 63° C. Upon final distillation 107.5 grams (a 77.5 percent yield) of linear 1,5-dichlorohexamethyltrisiloxane product was recovered which had a boiling point of 83° to 84° C. at 20 mm. and a refractive index of $n_D^{25}=1.4032$. The vapor phase chromatographic analysis of said siloxane product showed it to be over 99.5 percent pure and have a specific refraction of $R_D=0.2384$. Further analysis found the percent of chlorine and silicon to be Cl, 25.6; Si, 30.19 for the above product $C_6H_{18}O_2Cl_2Si$, while the theoretical calculation is Cl, 25.56; Si, 30.37.

Other linear chlorine endblocked siloxanes can be produced by employing in place of the above cyclosiloxane starting material other cyclosiloxane reactants, such as $$(MeEtSiO)_3$$
$$(MeEtSiO)_5$$
$$(Me_2SiO)_2(Et_2SiO)_2$$
$$(Me_2SiO)_2((MeXVi)SiO)$$
$$[(Cl_2C_6H_3)(Me)SiO]_3$$
$$(Me_2SiO)_3((Me)(\phi)SiO)$$
$$(Me_2SiO)_3(\phi_2SiO)$$
$$(Me_2SiO)_4((Me)(\phi)SiO)$$
$$(Me_2SiO)_4(\phi_2SiO)$$
$$[(C_8H_{17})_2SiO]_3$$
$$[(NCCH_2CH_2)(Me)SiO]_3$$

and the like.

EXAMPLE 4

A one liter flask equipped with a reflux condenser was charged with 148.3 grams (0.50 mole) of octamethylcyclotetrasiloxane, 416.4 grams (3.5 moles) of thionyl chloride and 4.29 grams of triphenylphosphine catalyst. Upon heating rapid sulfur dioxide gas evolution commenced about 50° C. and the temperature rose to 65° C. over 4 hours at which time the weight loss of sulfur dioxide was 23.3 grams. After an additional 18 hours at 65° C. the resultant weight loss of sulfur dioxide gas was 30.1 grams (32 grams theoretical). The desired product was obtained by vacuum fractional distillation of the solution recovered after stripping the excess thionyl chloride at atmospheric pressure and decanting from the precipitated catalyst. The clear colorless product was 152.1 grams (an 86.5 percent yield) of linear 1,7-dichlorooctamethyltetrasiloxane having the structural formula Cl-(SiMe$_2$O)$_3$SiMe$_2$Cl having a boiling point of 115° C. (20 mm.) and a refractive index of $n_{D25}$=1.4037.

EXAMPLE 5

A one liter flask equipped with a reflux condenser was charged with 148.3 grams (0.50 mole) of octamethylcyclotetrasiloxane, 416.2 grams of thionyl chloride and 3.9 grams of pyridine N-oxide catalyst and held at 65–70° C. For 18.5 hours until sulfur dioxide gas ceased evolving. Recovery of the desired product by the procedure in Example 4 gave 137.7 grams (a 77.4 percent yield) of linear 1,7-dichlorooctamethyltetrasiloxane having a boiling point of 110° C. (20 mm.) with a refractive index of $n_D^{25}$=1.4034. The vapor phase chromatographic analysis of said product showed it to be over 99.5 percent pure and have a specific refraction of $R_D$=0.2404. Further analysis found the percent of chlorine and silicon to be Cl, 20.11; Si, 31.66 for the above product $$C_8H_{24}O_3Cl_2Si_4$$

while the theoretical calculation is Cl, 20.17; Si, 31.96.

EXAMPLE 6

A one liter flask equipped with a reflux condenser was charged with 185.4 grams of a mixture of about 66 percent of decamethylcyclopentasiloxane and about 34 percent of octamethylcyclotetrasiloxane, 520.5 grams (4.37 moles) of thionyl chloride and 3.335 grams of triphenylphosphine catalyst. The solution was held at 60°–65° C. for 18 hours by which time the evolution of sulfur dioxide gas had ceased and the weight loss of said gas was 31 grams. Fractional distillation afforded 43.6 grams of linear 1,7-dichlorooctamethyltetrasiloxane product and 89 grams of linear 1,9-dichlorodecamethylpentasiloxane product (a 95 percent yield for said linear pentasiloxane) having the structural formula Cl-(SiMe$_2$O)$_4$SiMe$_2$Cl which had a boiling point of 139°–141° C.; a refractive index of $n_D^{25}$=1.4030 and a specific refraction of $R_D$=0.2416. Further analysis found the percent of chlorine and silicon to be Cl, 16.52; Si 32.89 for the above product $$C_{10}H_{30}O_4Cl_2Si_5$$

while the theoretical calculation is Cl, 16.66; Si, 32.99.

EXAMPLE 7

Linear 1,7-dichlorooctamethyltetrasiloxane was prepared by repeating the procedure in Example 4 using (phenyl)(diethyl)phosphine, ($\phi$)(C$_2$H$_5$)$_2$P, as the catalyst at a reaction temperature of 60° to 67° C. After about 18 hours the resultant weight loss of sulfur dioxide gas was 28 grams (32 grams theoretical).

EXAMPLE 8

Linear 1,7-dichlorooctamethyltetrasiloxane was prepared by repeating the procedure in Example 4 using n-tributylphosphine oxide as the catalyst at a reaction temperature of 69° C. After about 21 hours the resultant weight loss of sulfur dioxide gas was 32.8 grams (32 grams theoretical).

EXAMPLE 9

A 60 percent yield of linear 1,7-dichlorooctaethyltetrasiloxane was prepared by following the procedure in Example 4 using octaethylcyclotetrasiloxane as the starting material.

EXAMPLE 10

Following the procedures described in the above examples for the process of this invention similar linear chloroendblocked siloxanes can be prepared by reacting at a temperature range of about 50° C. to 70° C. the cyclosiloxane starting material with an excess mole amount of thionyl chloride in the presence of a catalytic amount of catalyst as shown by the following illustrative table.

TABLE I

| No. | Cyclic | Chloride | Catalyst | Linear Product |
|---|---|---|---|---|
| 1 | (Et$_2$SiO)$_3$ | Excess SOCl$_2$ | (C$_8$H$_{17}$)$_3$P | Cl(SiEt$_2$O)$_2$SiEt$_2$Cl |
| 2 | (Et$_2$SiO)$_5$ | do | $\phi_2$(n-Bu)PO | Cl(SiEt$_2$O)$_4$SiEt$_2$Cl |
| 3 | (Me$_2$SiO)$_4$ | do | (n-Bu)$_3$P | Cl(SiMe$_2$O)$_3$SiMe$_2$Cl |
| 4 | (Me$_2$SiO)$_4$ | do | $\phi$(n-Bu)$_2$P | Cl(SiMe$_2$O)$_3$SiMe$_2$Cl |
| 5 | (Me$_2$SiO)$_4$ | do | $\phi$(n-Bu)$_2$PO | Cl(SiMe$_2$O)$_3$SiMe$_2$Cl |
| 6 | [(Me)(Et)SiO]$_4$ | do | $\phi_3$P | Cl(SiMeEtO)$_3$SiMeEtCl |
| 7 | [(Me)(Vi)SiO]$_3$ | do | $\phi_3$P | Cl(SiMeViO)$_2$SiMeViCl |
| 8 | [(NCCH$_2$CH$_2$)(Me)SiO]$_3$ | do | (n-Bu)$_3$P | Cl[Si(CH$_2$CH$_2$CN)(Me)O]$_2$Si(CH$_2$CH$_2$CN)(Me)Cl |
| 9 | [(CF$_3$CH$_2$CH$_2$)(Me)SiO]$_3$ | do | $\phi$(n-Bu)$_2$P | Cl[Si(CH$_2$CH$_2$CF$_3$)(Me)O]$_2$Si(CH$_2$CH$_2$CF$_3$)(Me)Cl |
| 10 | (Me$_2$SiO)$_3$ | do | [(CH$_3$)$_2$N]$_3$PO | Cl(SiMe$_2$O)$_2$SiMe$_2$Cl |
| 11 | (Me$_2$SiO)$_4$ | do | p-Me-C$_6$H$_4$NO | Cl(SiMe$_2$O)$_3$SiMe$_2$Cl |
| 12 | (Me$_2$SiO)$_4$ | do | $\phi_3$P and $\Phi_3$PO | Cl(SiMe$_2$O)$_3$SiMe$_2$Cl |

EXAMPLE 11

A solution of 148.3 grams (0.50 mole) of octamethylcyclotetrasiloxane; 60 grams (0.75 mole) of thionyl chloride; 2.1 grams of triphenylphosphine catalyst and 50 ml. of 1,2-dimethoxyethane was reacted at 65° to 68° C. for about 22 hours and an 81 percent yield of linear 1,7-dichlorooctamethyltetrasiloxane product was obtained after final distillation.

Instead of employing 1,2-dimethoxyethane as the catalyst solvent other commercial solvents can be employed such as benzene, n-hexane, chlorobenzene, acetonitrile and the like.

EXAMPLE 12

Linear 1,7-dichlorooctamethyltetrasiloxane was prepared by reacting about 0.5 mole of octamethylcyclotetrasiloxane with about 0.5 mole of thionyl chloride in the presence of a catalytic amount of triphenylphosphine at 50° to 70° C. until sulfur dioxide gas ceased to evolve. However, the yield of product is not nearly as high as when an excess amount of thionyl chloride is used.

Various modifications and variations of this invention will be obvious to a worker skilled in the art and it is understood that such modifications and variations are to be included within the purview of this application and the spirit and scope of the appended claims.

What is claimed is:

1. A process for preparing linear chlorine terminated polysiloxane compounds which comprises reacting in the presence of a catalytic amount of a catalyst selected from the group consisting of (1) a phosphine compound having the formula R$_3$P wherein each R is independently a monovalent hydrocarbon radical containing from 1 to 8 carbon atoms; (2) a phosphine oxide having the formula R$_3$PO where each R is independently a monovalent hydrocarbon radical containing from 1 to 8 carbon atoms or a dimethylamino radical; and (3) an amine N-oxide having the formula R$_3$N→O where each R is independently a monovalent hydrocarbon radical containing from 1 to 8 carbon atoms or R and N taken together form a pyridine radical; and mixtures thereof, (A) an organocyclosiloxane compound of the formula $$(R_2SiO)_a(RR'SiO)_b$$

or mixtures thereof, wherein each R is a radical independently selected from the group consisting of monovalent hydrocarbon radicals having from 1 to 18 carbon atoms and substituted monovalent hydrocarbon radicals having from 1 to 18 carbon atoms, wherein each R' is a radical independently selected from the group consisting of monovalent nonaromatic hydrocarbon radicals having from 1 to 18 carbon atoms and substituted monovalent nonaromatic hydrocarbon radicals having from 1 to 18 carbon atoms; wherein said substituents for the substituted R and R' radicals are selected from the group consisting of halogen, cyano, nitro, acyloxy and alkoxy radicals; and wherein $a$ is an integer of from 1 to 2 inclusive; $b$ is an integer of from 1 to 4 inclusive and sum of $(a+b)$ siloxy units equal 3 to 5 inclusive; with (B) thionyl chloride where the amount of thionyl chloride employed is sufficient to cleave the cyclosiloxane ring of the starting material.

2. A process as defined in claim 1, wherein a solvent for the catalyst is also present.

3. A process as defined in claim 1 wherein each R is independently a radical containing from 1 to 8 carbon atoms selected from the group consisting of alkyl, substituted alkyl, aryl, substituted aryl, and vinyl radicals; wherein each R' is independently a radical containing from 1 to 8 carbon atoms selected from the group consisting of alkyl, substituted alkyl and vinyl radicals.

4. A process as defined in claim 1, wherein each R radical on the cyclosiloxane is independently selected from the class consisting of methyl, ethyl, vinyl and phenyl radicals; wherein each R' is independently selected from the class consisting of methyl, ethyl and vinyl radicals and wherein the catalyst is selected from the class consisting of $(C_6H_5)_3P$, $(n-C_4H_9)_3P$, $(C_6H_5)(C_2H_5)_2P$ and $(C_6H_5)(n-C_4H_9)_2P$.

5. A process as defined in claim 1, wherein each R radical on the cyclosiloxane is independently selected from the class consisting of methyl, ethyl, vinyl and phenyl radicals; wherein each R' is independently selected from the class consisting of methyl, ethyl and vinyl radicals and wherein the catalyst is selected from the class consisting of $(C_6H_5)_3PO$, $(C_6H_5)(n-C_4H_9)_2PO$; $(n-C_4H_9)_3PO$ and $[(CH_3)_2N]_3PO$.

6. A process as defined in claim 1, wherein each R on the cyclosiloxane is independently selected from the class consisting of methyl, ethyl, vinyl and phenyl radicals; wherein each R' is independently selected from the class consisting of methyl, ethyl and vinyl radicals and wherein the catalyst is a pyridine N-oxide.

7. A process as defined in claim 4, wherein the cyclosiloxane is octamethylcyclotetrasiloxane.

8. A process as defined in claim 5, wherein the cyclosiloxane is octamethylcyclotetrasiloxane.

9. A process as defined in claim 6, wherein the cyclosiloxane is octamethylcyclotetrasiloxane.

10. A process as defined in claim 3, wherein a solvent for the catalyst is also present.

References Cited

UNITED STATES PATENTS

| | | | |
|---|---|---|---|
| 3,162,662 | 12/1964 | Brown et al. | 260—448.2 |
| 3,235,579 | 2/1966 | Brown et al. | 260—448.2 |
| 3,308,092 | 3/1967 | Lentz | 260—448.2 X |
| 3,308,093 | 3/1967 | Lentz | 260—448.2 X |
| 3,308,145 | 3/1967 | Lentz | 260—448.2 |
| 3,308,148 | 3/1967 | Hahn et al. | 260—448.2 |
| 3,308,152 | 3/1967 | Lentz | 260—448.2 |
| 3,350,350 | 10/1967 | Nitzsche et al. | 260—448.2 X |

TOBIAS E. LEVOW, Primary Examiner

W. F. W. BELLAMY, Assistant Examiner

U.S. Cl. X.R.

260—46.5 G